United States Patent
Mackert, Sr.

[11] Patent Number: 6,148,942
[45] Date of Patent: Nov. 21, 2000

[54] INFANT STROLLER SAFELY PROPELLED BY A DC ELECTRIC MOTOR HAVING CONTROLLED ACCELERATION AND DECELERATION

[76] Inventor: James M. Mackert, Sr., 870 Hartford Dr., Elyria, Ohio 44035

[21] Appl. No.: 09/177,072

[22] Filed: Oct. 22, 1998

[51] Int. Cl.$^7$ .................. B62B 9/08; B60K 1/00
[52] U.S. Cl. ............ 180/65.6; 180/65.8; 188/69; 192/15; 192/17 R
[58] Field of Search ................... 180/65.6, 65.1, 180/65.5, 315, 343, 907, 188, 65.8; 280/47.38, 642, 654, 647, 650; 192/16, 17 R, 19, 219, 220, 15; 188/20, 31, 69

[56] References Cited

U.S. PATENT DOCUMENTS

| | | | |
|---|---|---|---|
| 555,949 | 9/1896 | Stallard et al. | 180/907 X |
| 675,392 | 6/1901 | Keating . | |
| 1,172,456 | 3/1916 | Hoadley . | |
| 1,747,560 | 2/1930 | Weathers . | |
| 2,004,470 | 8/1935 | Michal . | |
| 2,728,431 | 2/1955 | Keck | 192/17 R X |
| 2,742,973 | 4/1956 | Johannesen | 180/65 |
| 3,077,794 | 2/1963 | Candellero | 192/17 |
| 3,506,100 | 4/1970 | Tomozawa | 192/19 |
| 3,754,616 | 8/1973 | Watland . | |
| 3,907,051 | 9/1975 | Weant et al. . | |
| 3,908,776 | 9/1975 | Dudley | 180/65 |
| 3,955,639 | 5/1976 | Cragg | 180/65 X |
| 4,050,533 | 9/1977 | Seamone | 180/6.5 |
| 4,199,036 | 4/1980 | Wereb | 180/6.5 |
| 4,209,073 | 6/1980 | Enix . | |
| 4,407,393 | 10/1983 | Youdin et al. . | |
| 4,412,688 | 11/1983 | Giordani . | |
| 4,416,107 | 11/1983 | Hoff | 192/17 R X |
| 4,483,405 | 11/1984 | Noda et al. | 180/907 X |
| 4,629,044 | 12/1986 | Post et al. | 192/17 R X |
| 4,759,418 | 7/1988 | Goldenfeld et al. | 180/65.1 |
| 4,807,716 | 2/1989 | Hawkins | 180/65.1 |
| 4,823,900 | 4/1989 | Farnam | 180/907 X |
| 5,156,226 | 10/1992 | Boyer et al. . | |
| 5,199,520 | 4/1993 | Chen | 180/65.5 |
| 5,253,724 | 10/1993 | Prior | 180/907 X |
| 5,280,935 | 1/1994 | Sobocan . | |
| 5,293,879 | 3/1994 | Chen . | |
| 5,307,890 | 5/1994 | Huang . | |
| 5,370,408 | 12/1994 | Eagan | 280/47.38 X |
| 5,370,572 | 12/1994 | Lee | 280/647 X |
| 5,601,297 | 2/1997 | Stein | 188/20 X |
| 5,622,375 | 4/1997 | Fairclough | 280/642 |
| 5,669,620 | 9/1997 | Robbins | 280/657 X |
| 5,685,798 | 11/1997 | Lutz et al. | 180/65.6 X |
| 5,692,760 | 12/1997 | Pickering . | |
| 5,713,585 | 2/1998 | Curtis . | |
| 5,873,425 | 2/1999 | Yang | 180/65.6 |
| 5,984,334 | 11/1999 | Dugas | 280/650 X |
| 5,988,012 | 11/1999 | Arnoth | 280/647 X |

*Primary Examiner*—Michael Mar
*Attorney, Agent, or Firm*—Joseph H. Taddeo

[57] ABSTRACT

A self-propelled motorized infant stroller powered by DC electric motors with safely controlled acceleration and deceleration. As a discrete safety function, the controlled acceleration and deceleration prevents the child occupant from lurching, either forward or backward, upon the starting or stopping of the baby carriage. A single speed control dial establishes the setting of the desired traversing speed. The propulsion system is safely controlled through the use of a set of dual handle switches that both must be simultaneously depressed to start the propulsion system. A safety seat harness is used to protect the infant occupant from sliding or climbing out of the carriage seat. Additional safety is provided by a parking brake system to prevent accidental propulsion or any unforeseen stroller movement, particularly when stopped on an inclined surface.

11 Claims, 11 Drawing Sheets

6,148,942

INFANT STROLLER SAFELY PROPELLED BY A DC ELECTRIC MOTOR HAVING CONTROLLED ACCELERATION AND DECELERATION

FIELD OF INVENTION

The present invention relates primarily to an infant stroller, and more particularly to a baby carriage motively powered by a DC electric motor having a safely controlled acceleration and deceleration, as a discrete safety function to prevent the occupant from lurching when providing propulsion or when ceasing propulsion. Secondarily, the present invention relates to an infant stroller having a novel means of safely starting the propulsion system, which also includes a braking system to prevent accidental propulsion, when stopped on an inclined surface.

BACKGROUND OF THE INVENTION

Carrying an infant for a long period of time can be quite fatiguing. To alleviate the problem of fatigue, strollers have been used as an auxiliary conveyance vehicle for infants for some time. A stroller may best be described as a four-wheeled folding carriage designed as a chair in which an infant may be manually pushed.

However, even in today's day and age, manually pushing a stroller can be tiresome, as well, especially when used in crowded shopping malls or amusement parks.

Many of the strollers in use today lack the necessary and essential safety protective measures and equipment that will protect the infant.

Power driven conveyances, such as power driven wheelchairs are often too awkward and cumbersome to use. The necessary drive components have resulted in relatively heavy and awkward constructions. Because the batteries, with their associated drive motors are significantly heavy, the frame design must be of a more rigid construction. Typically, these power driven wheelchairs have heavy-duty frames to support all of the equipment. These designs generally result in configurations that are not easily folded or disassembled compactly so that it can be transported in a standard passenger vehicle.

The following prior art discloses teachings of motively operated conveyances that often are too heavy and awkward to use, lack the convenience of portability and are deficient in safety apparatus, especially when conveying an infant.

U.S. Pat. No. 4,412,688, granted Nov. 1, 1983, to P. Giordani, discloses a wheeled support structure for a seat of a baby's push-type chair. The structure includes two flat side frames connected by crosspieces, each of which has a pair of shafts pivoted together and provided with wheels.

U.S. Pat. No. 5,156,266, granted Oct. 20, 1992, to R. G. Boyer, et al., discloses a modular power driven wheelchair whose wheeled base frame is adapted for easy mounting and dismounting of a seat module. The wheelchair is comprised of a base frame, having wheels, a seat module, a battery module, and a controller module to control battery powered operation of one or more drive motors. The base and seat modules are designed for easy size adjustment to accommodate the child, as the child grows in size.

U.S. Pat. No. 5,307,890, granted May 3, 1994, to Huo-Chang Huang, discloses an improved chassis structure for a child driven electric car, which can be safely remote controlled. The pedals on the car have a starting switch and a braking switch. Remote operation by an adult controls the direction of movement to prevent the car from going into a dangerous area to avoid injury to the child.

U.S. Pat. No. 5,713,585, granted Feb. 3, 1998, to G. M. Curtis, et al., discloses a manually push propelled stroller, having a plurality of wheels. A brake handle is moveably mounted to the push handle. The braking assembly precludes rotation of the wheels during the absence of an attendant grasping the brake handle.

The present invention differs from the aforementioned prior art in that the apparatus is not limited to the manual propulsion of a child occupied vehicle, such as a push propelled stroller, nor to a moveably mounted push handled braking system for a push-type stroller. For motor driven vehicles, it differs from Huang, who provides for the overridden remotely controlled child operated, electrically driven vehicle, and from Boyer, et al., who provides a motorized wheelchair that is increasingly size adjustable as the occupant increases in size.

Accordingly, it is therefore an object of the present invention to provide a safely operated lightweight modularized infant stroller having a motorized propulsion system.

It is another object of the present invention to provide a safely operated lightweight modularized motor driven infant stroller having the essential safety apparatus to protect the infant passenger being transported.

It is still another object of the present invention to provide a safely operated lightweight modularized infant stroller having a motorized propulsion system, having a controlled acceleration and deceleration to protect the infant passenger being transported.

It is still a further object of the present invention to provide a speed dial to aid in setting the desired set point velocity.

It is still yet another object of the present invention to provide a safely operated lightweight modularized motor driven infant stroller having a set of dual switches, one for each hand, so that when both are simultaneously depressed, the DC drive motors become energized; thereby creating a safe startup.

It is still yet a further object of the present invention to provide a safely operated lightweight modularized infant stroller having a covered housing for the battery to aid in the removal of the battery and to further protect the infant passenger from coming in contact with the enclosed battery.

Additionally, it is another object of the present invention to provide a safely operated lightweight modularized infant stroller having an operating lever to disengage the DC drive motors, in the event the system becomes inoperative, such as may be caused by the battery becoming discharged after frequent use.

A final object of the present invention to provide a safely operated lightweight modularized infant stroller having a parking brake system to be applied when the stroller is not in use, thereby preventing the stroller to inadvertently roll down an inclined plane.

These as well as other objects and advantages of the present invention will be better understood and appreciated upon reading the following detailed description of the preferred embodiment when taken in conjunction with the accompanying drawings.

SUMMARY OF THE INVENTION

The general objective of the present invention is to provide a motorized infant stroller that has controlled acceleration and deceleration of the motorized vehicle to prevent a jerking motion from being applied to the infant passenger when starting or stopping the propulsion.

Excessive acceleration forces may cause the infant to lurch backwards when starting or may cause the occupant to lurch forwards when stopping. By controlling the forward velocity so that it is linearly increasing during starting and linearly decreasing during stopping, the amount of g forces exerted to the body of the infant being conveyed is limited to a safe value, thereby preventing an excessive acceleration or deceleration force upon the child occupant.

In the preferred embodiment, the DC electric motors provide the motive power for the forward movement of the stroller by driving each wheel independently using separate drive motors. In an alternative embodiment, the front wheels can be mounted to a single axle and driven by a single DC electric motor. Still, in another embodiment, the rear wheels may be used to provide the motive power, either by using a single axle driven by a single motor or by driving each wheel independently, using separate motors. Alternatively, in the event that the desired motor speed needs to be further reduced, a speed-reducing gearbox may be used in conjunction with each DC electric motor. A frictional foot brake is used in conjunction with the gear ratio to be applied when the stroller is not being used, thereby preventing the stroller from inadvertently rolling down a hill.

In the event the system becomes inoperative, such as caused by the battery becoming discharged after frequent use, the stroller provides for an operating lever to disengage the DC electric drive motor.

A sealed gel type rechargeable battery provides the energy necessary to drive the DC electric motors. The sealed battery prevents injury from battery acids to the occupant as well as to the attendant. A covered compartment, made of plastic, enables the enclosed battery to easily be removed, as well as to protect the infant from coming in contact with the battery itself.

A dual set of hand operated switches must be simultaneously be depressed to energize the DC electric motors. Once the motors are running, only one of the switches needs to be gripped to keep the motor energized. A speed dial provides the set point necessary to maintain a relatively constant traversing speed.

BRIEF DESCRIPTION OF THE DRAWINGS

The present invention is pictorially illustrated in the accompanying drawings that are attached herein.

DETAILED DESCRIPTION OF THE INVENTION

Figure 1:
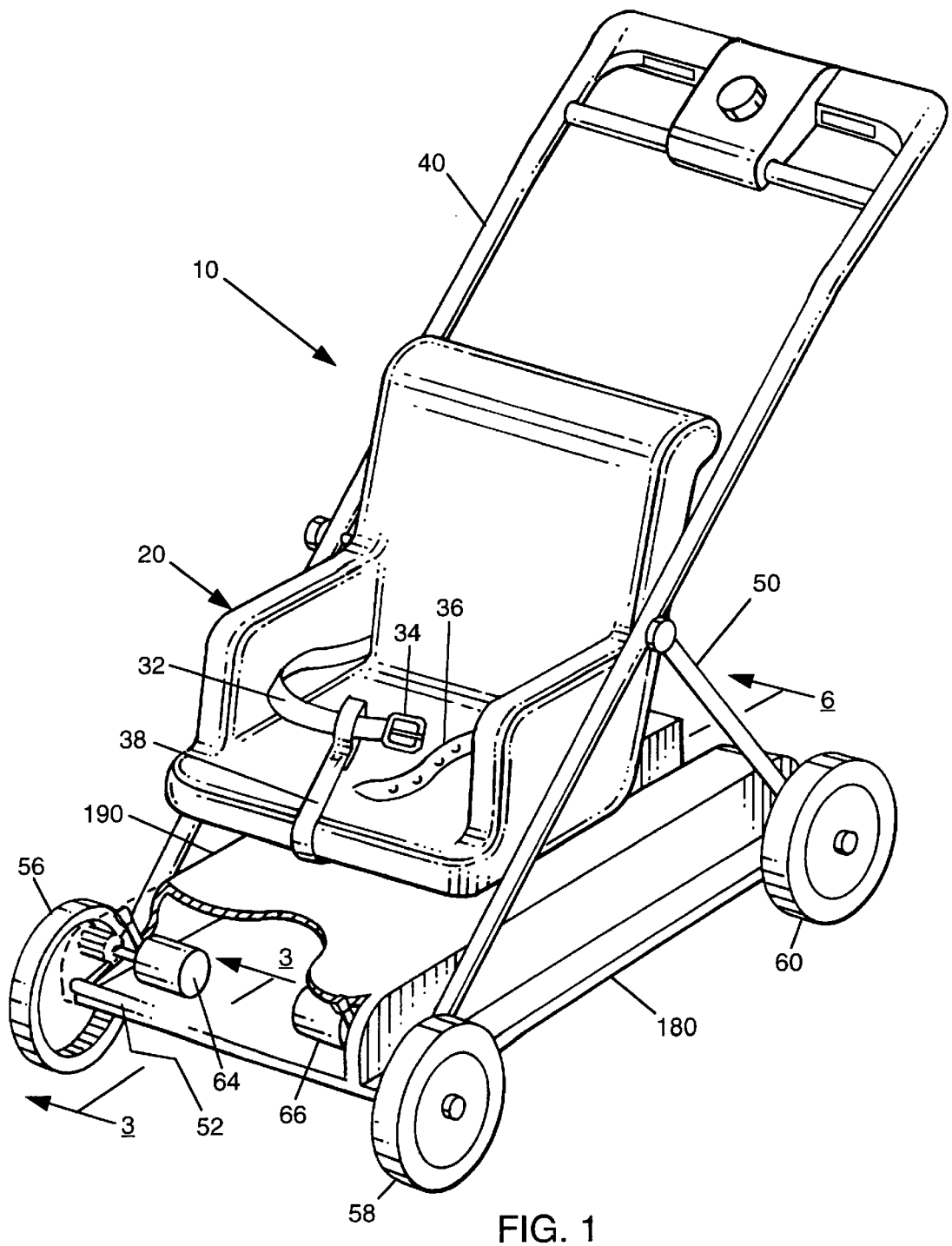
FIG. 1 is a perspective view of the motorized infant stroller, powered by two DC electric motors.

The lightweight motorized infant stroller is shown in the detailed drawings that follow. In particular, FIG. 1 is a perspective drawing that shows the infant stroller 10 that embodies the principles and concepts of the present invention. The padded infant seat 20 is supported by the lightweight U-shaped frame 40 and by the pivoted tubular shafts 50.

Figure 2:
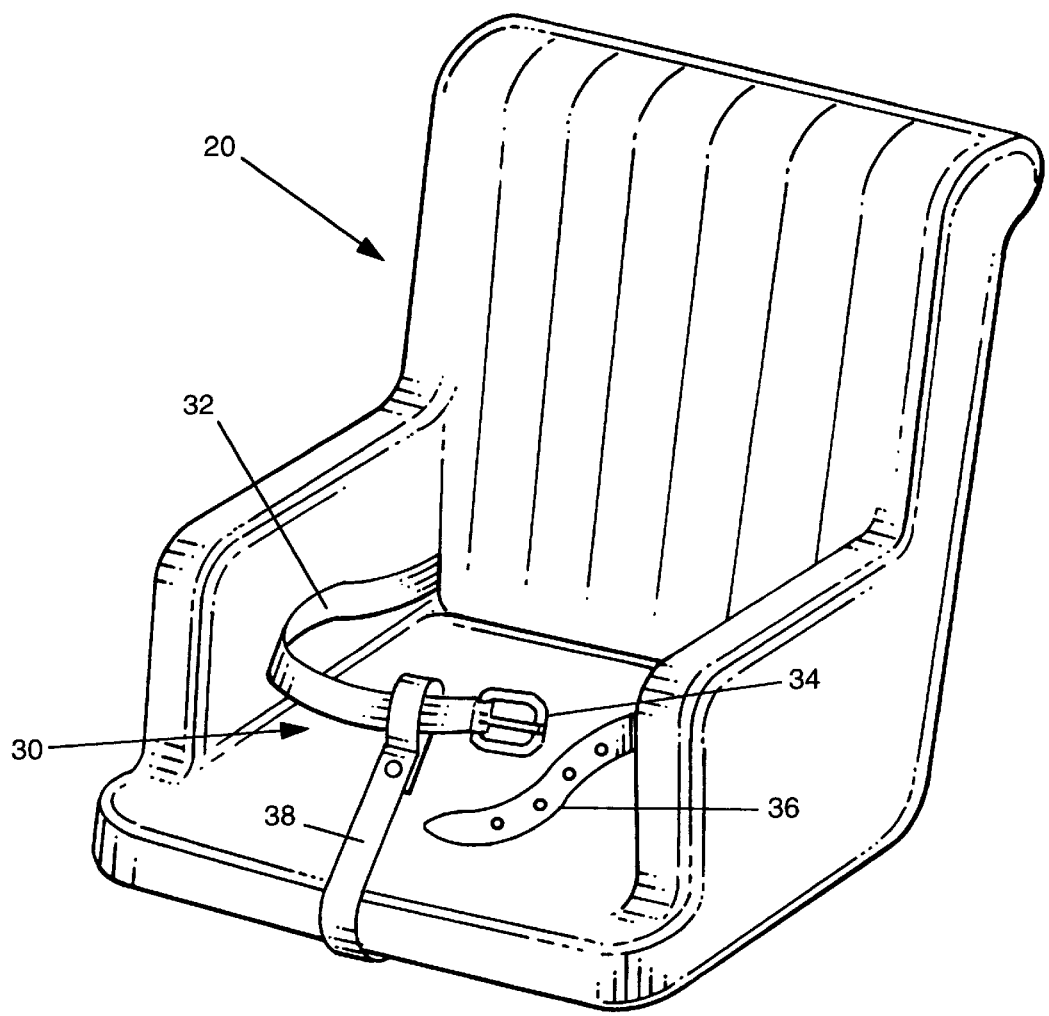
FIG. 2 is an exploded perspective view of the carriage seat assembly detailing the safety seat straps.

As is shown in FIGS. 1 and 2, the padded infant seat 20 is comprised of a rigid plastic frame that has a cushioned padding made of lightweight polyurethane foam. A vinyl covering over the entire seat structure completes the padded seat assembly. The safety seat harness assembly 30 is comprised of a vinyl seat strap 32 having a buckle 34 to engage the opposing seat strap 36. A centrally mounted seat strap 38 having a looped end to encompass the seat strap 32 safely secures the infant in the seat, thereby preventing the child from sliding beneath the seat straps 32 and 36 when engaged by the buckle 34.

Referring again to FIG. 1, the motorized infant stroller base platform 180 supports the two main axle shafts: the front axle shaft 52 and the rear axle shaft 54. Attached to the front axle shaft are front wheels 56 and 58 and attached to the rear axle shaft, rear wheels 60 and 62.

Figure 3:
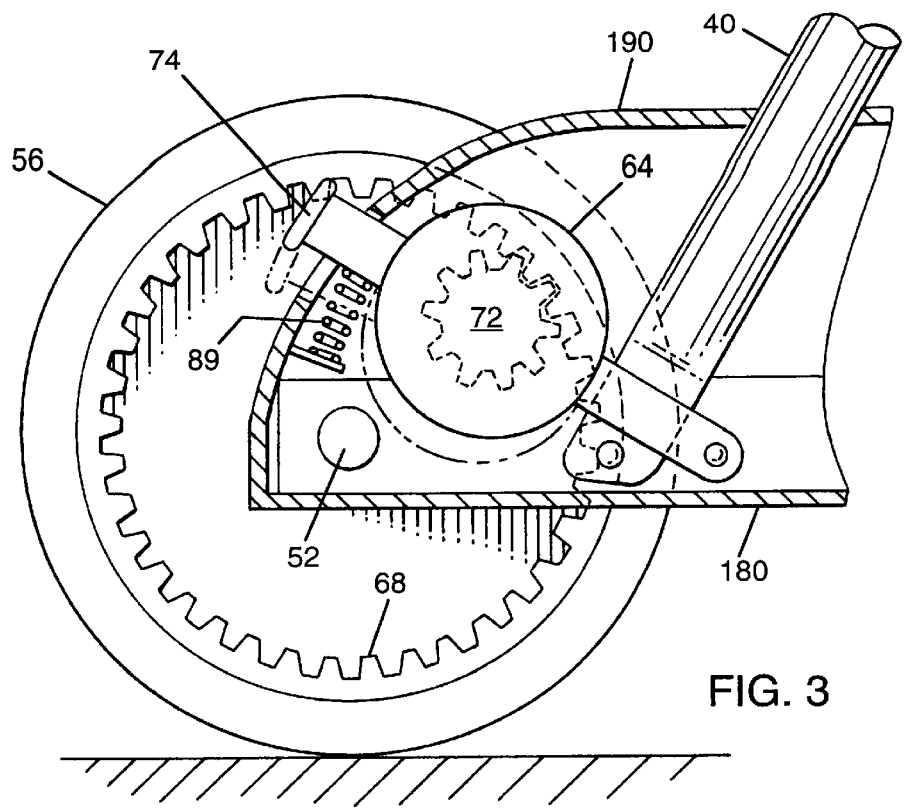
FIG. 3 is a right side section view of the infant stroller showing the drive engagement lever in the fully engaged position and in phantom, disengaged.
Figure 4:
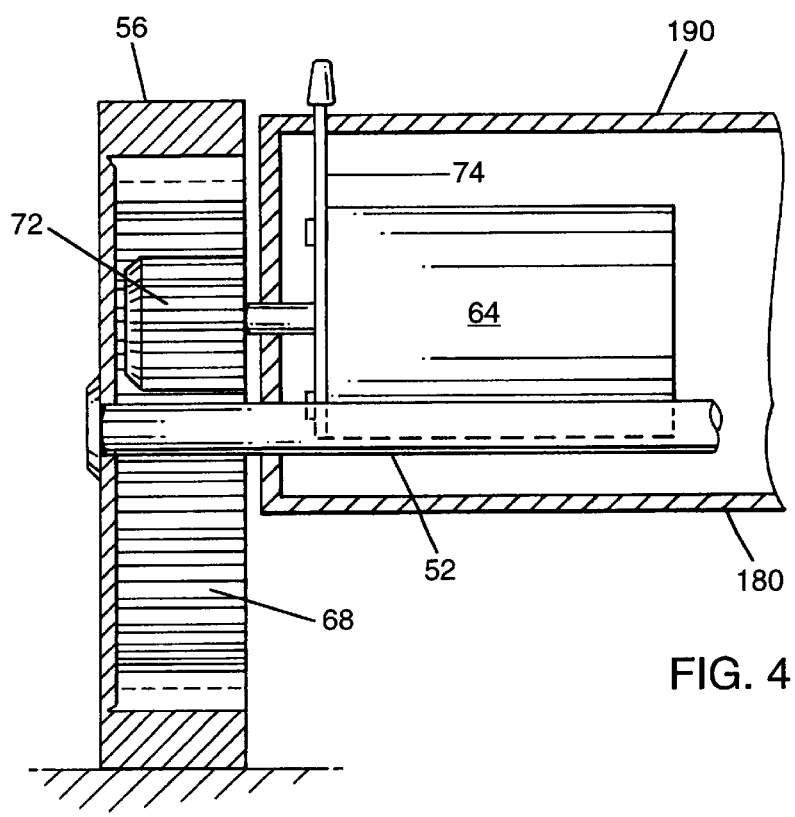
FIG. 4 is a right side section view from the front of the infant stroller showing the secure attachment of a DC electric drive motor to the drive engagement lever.
Figure 5:
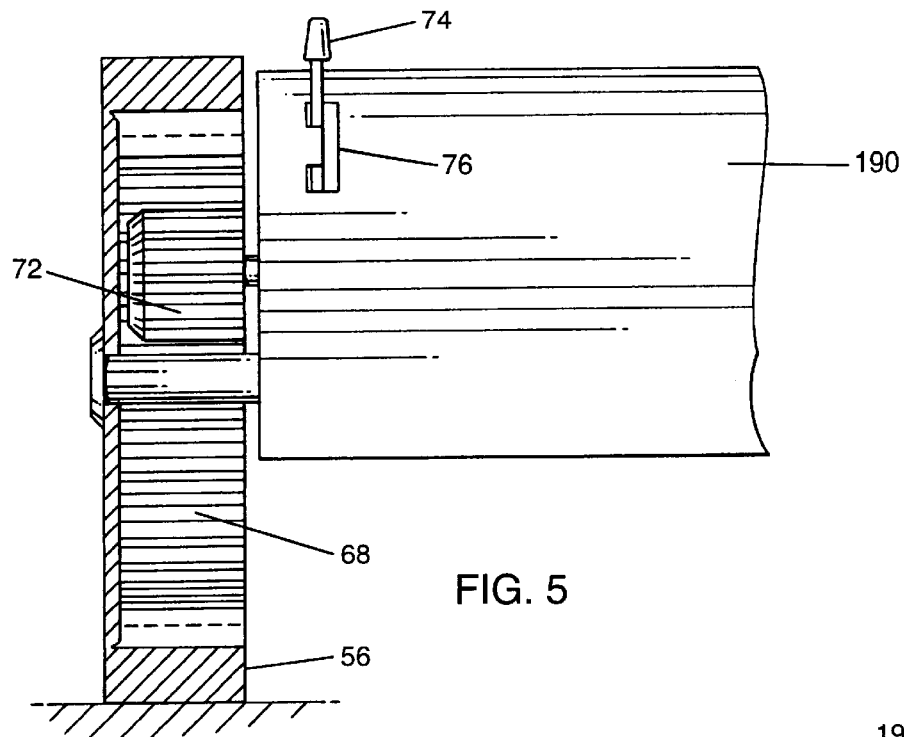
FIG. 5 is a front section view of a right infant stroller wheel showing the double-keyed slot for the drive engagement lever.
Figure 5A:
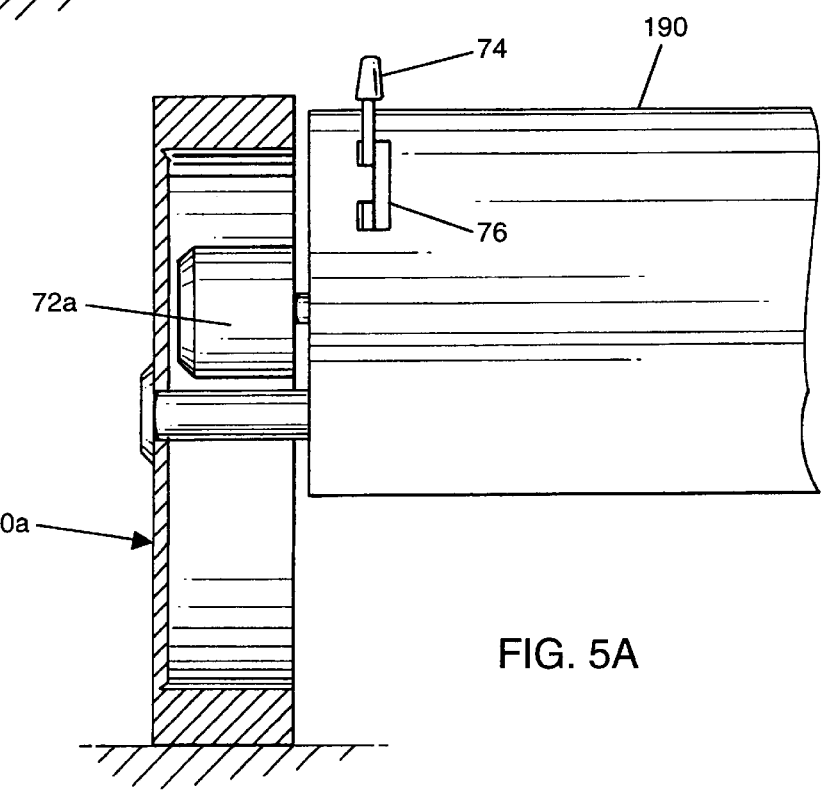
FIG. 5A is a front section view of the right infant stroller wheel wherein the pinion is replaced with a small drive wheel exterior to the stroller wheel for frictionally driving a surface portion of the stroller wheel.

Turning now to FIGS. 3, 4 and 5, each of the front wheels has large diameter internal toothed gears, 68 and 70, which are driven by smaller pinions 72, where each pinion is mounted and secured to the shafts of their respective DC electric drive motors 64 and 66, enclosed within protective cover 190. As such, the toothed gears of the wheel and the driving pinions are encased for safety. In the alternative embodiment of FIG. 5A, the pinion is replaced with a small drive wheel 70a exterior to the stroller wheel 60a for frictionally driving a surface portion of the stroller wheel.

In the preferred embodiment, the DC electric motors 64 and 66 provide the motive power for the forward movement of the stroller by independently driving each front wheel. In another embodiment, the front wheels can be mounted to a single axle and driven by a single DC electric motor. Alternatively, the rear wheels may be used to provide the motive power, either by using a single axle driven by a single motor or by driving each wheel independently, using separate motors. In still another embodiment, in the event that the desired motor speed needs to be further reduced, a speed-reducing gearbox may be used in conjunction with each DC electric motor.

In the event the system becomes inoperative because of a battery failure, a spring loaded drive engagement operating lever 74 is provided for each motor to disengage the DC electric drive motor, thereby allowing the stroller to be pushed manually.

Each drive motor is attached to their respective drive engagement lever 74 using two pan head machine screws. The double-keyed slot 76 and spring 77 in the protective cover 190 maintains the current position of the drive engagement lever 74, either fully engaged or fully disengaged.

Figure 6:
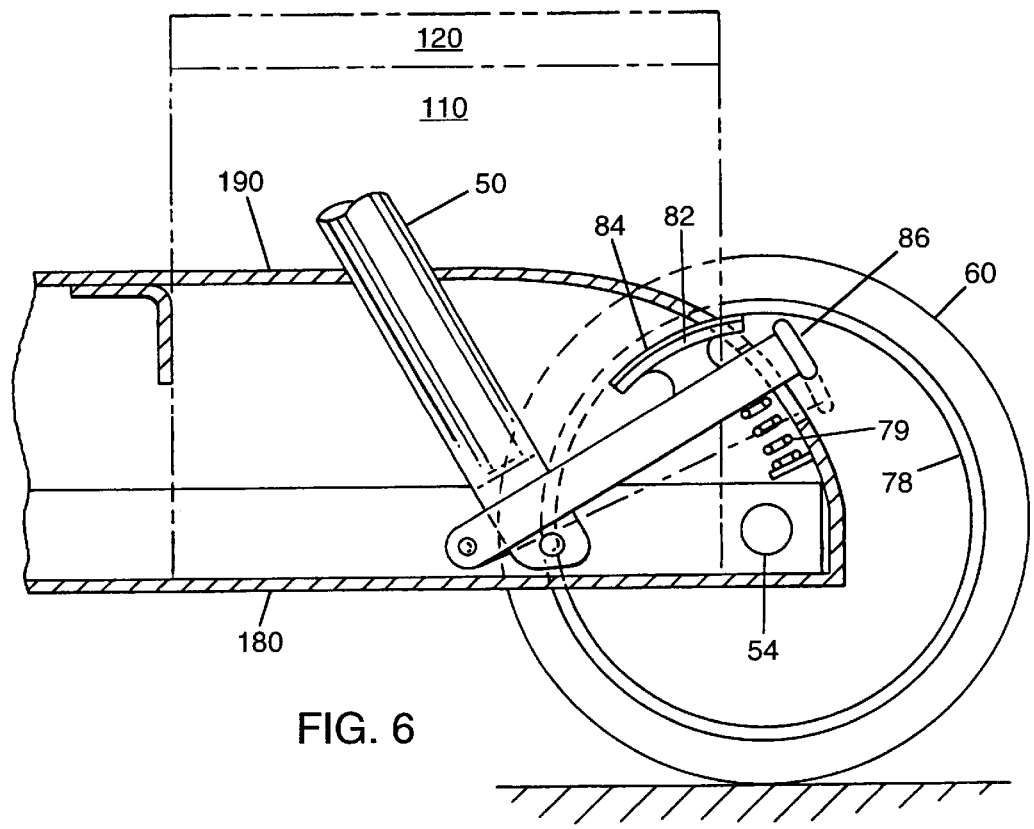
FIG. 6 is a partial section view of the right side of the infant stroller showing the parking brake engagement lever in the fully engaged position and in phantom lines, disengaged.
Figure 7:
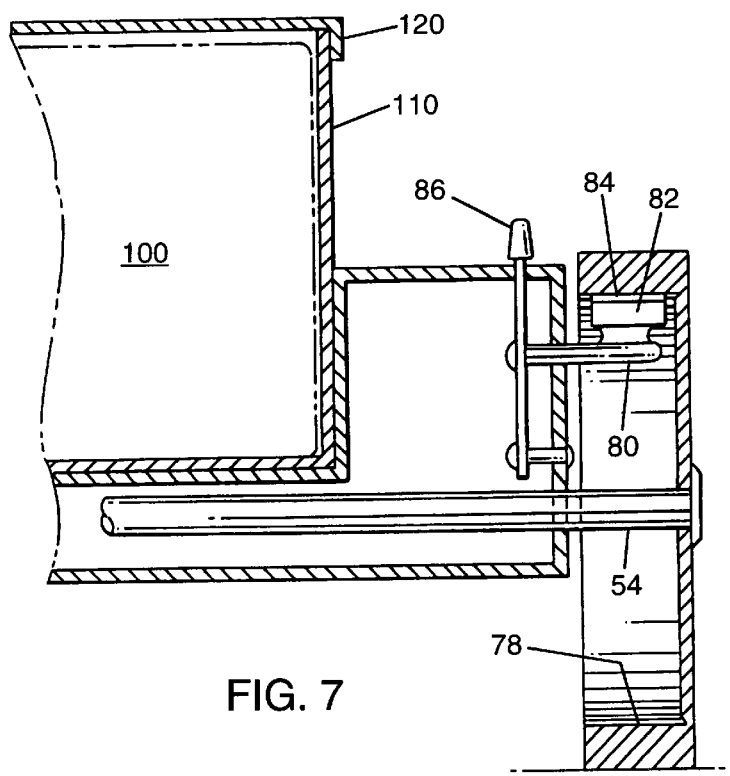
FIG. 7 is a section view from the right rear side of the infant stroller showing the attachment of the parking brake arm, including the brake drum and pad, to the parking brake engagement lever.
Figure 8:
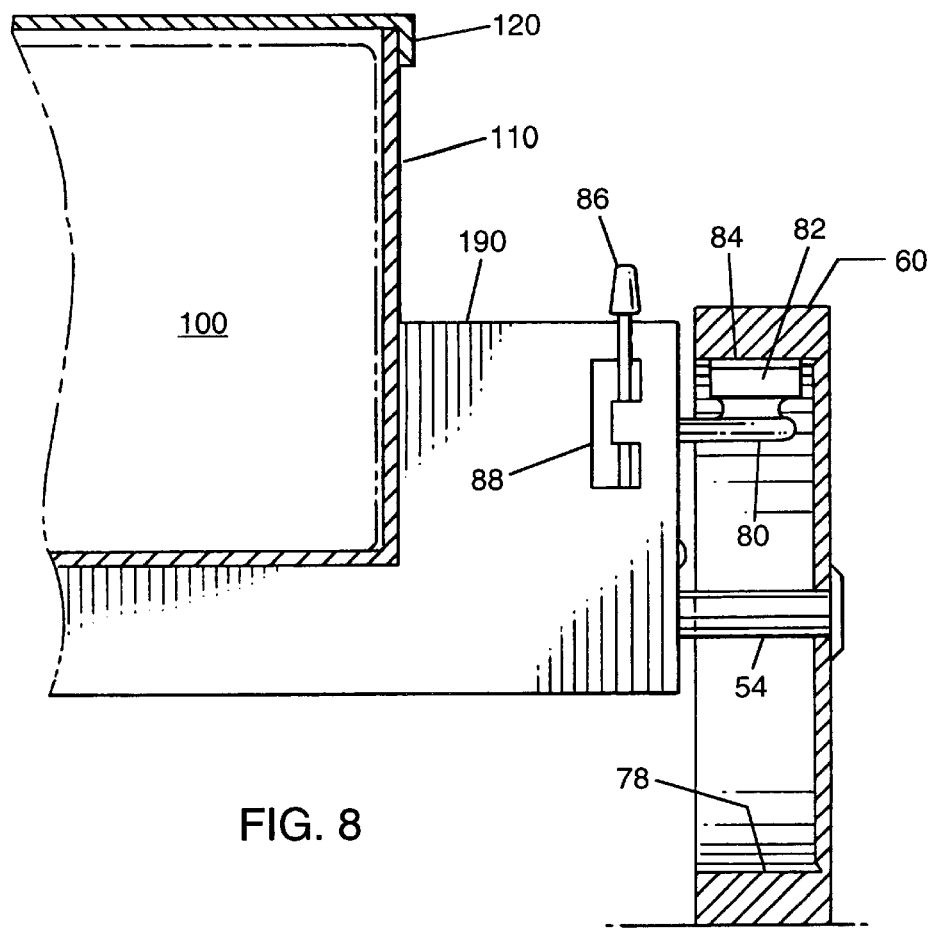
FIG. 8 is a section view of the right rear side of the infant stroller showing the double-keyed slot for the parking brake engagement lever.

The rear parking brake assembly is illustrated in FIGS. 6, 7 and 8. The spring loaded parking brake engagement lever 86 can be positioned in one of two basic positions where the parking brake is fully applied to each rear wheel independently or fully released as shown in phantom lines in FIG. 6. The double-keyed slot 88 and spring 89 in the protective cover 190 maintains the current position of the parking-brake engagement lever 86, either with the brake in the fully applied position (as shown) or with the brake fully released. The inner surface of each rear wheel comprises a brake drum 78, which becomes the braking surface when the brake pad 84 is in frictional contact. Connected to the parking brake engagement lever 86 is the brake arm 80, which supports the brake shoe 82. Integrally bonded to the brake shoe 82 is the frictional brake pad 84.

A sealed gel type rechargeable battery 100 provides the energy necessary to drive the DC electric motors 64 and 66. The sealed battery prevents injury from battery acids to the occupant as well as to the attendant. A covered compartment 110, made of plastic, enables the enclosed battery to easily be removed and transported, if necessary. The added cover 120 further protects the child passenger from coming in contact with the battery itself.

Figure 9:
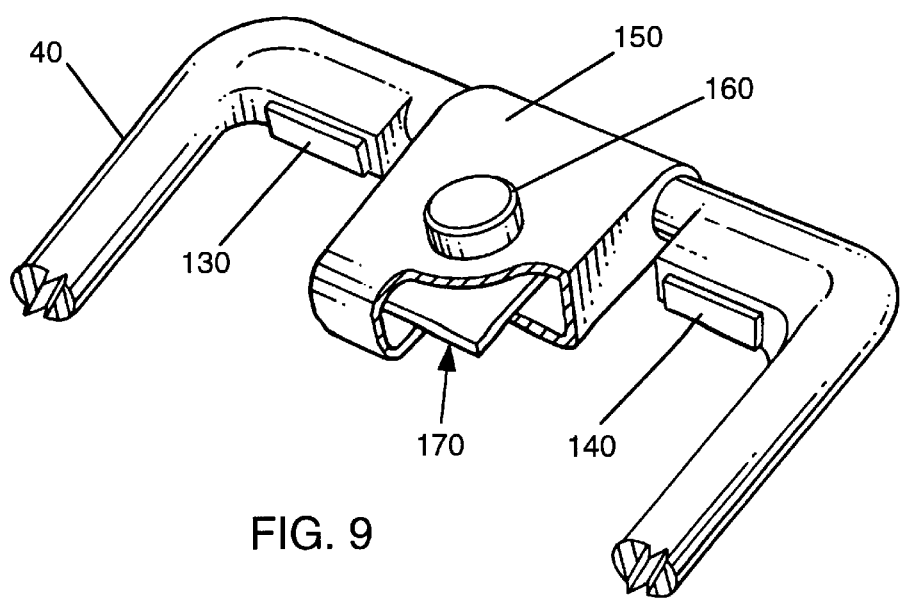
FIG. 9 is a perspective view of the infant stroller handle assembly illustrating the position of the dual hand safety switches, the speed set-point dial and the mounting arrangement for the component printed circuit board.

As an added safety measure, as depicted in FIG. 9, the motorized infant stroller 10 utilizes a dual set of hand operated switches that must be simultaneously be depressed to energize the DC electric motors 64 and 66. Accidental starting of the propulsion is prevented by providing that each switch actuator 130 and 140 must be simultaneously depressed to initiate the starting sequence, and by maintaining the grasp of switch actuator 130 to continue the propulsion of the infant stroller. Once energized, only one of the switch actuators, preferably switch actuator 130 for right handed operation, needs to be gripped to keep the motor energized.

Mounted to the upper central handle portion of the U-shaped handle 40 is the control console housing 150. Contained within the control console housing 150 is a printed circuit board assembly 170 upon which is mounted all of the circuitry to provide the speed control of the present invention. The speed dial 160 provides the set point necessary to maintain a relatively constant traversing speed.

The present invention provides a motorized infant stroller that has controlled acceleration and deceleration of the motorized vehicle to prevent a jerking motion from being applied to the infant passenger when starting or stopping the propulsion. Excessive acceleration forces may cause the child to lurch backwards when starting or may cause the occupant to lurch forwards when stopping. By controlling the forward velocity so that it is linearly increasing during starting and linearly decreasing during stopping, the amount of g forces exerted to the body of the infant being conveyed is limited to a safe value, thereby preventing an excessive acceleration or deceleration force upon the occupant.

Figure 10:
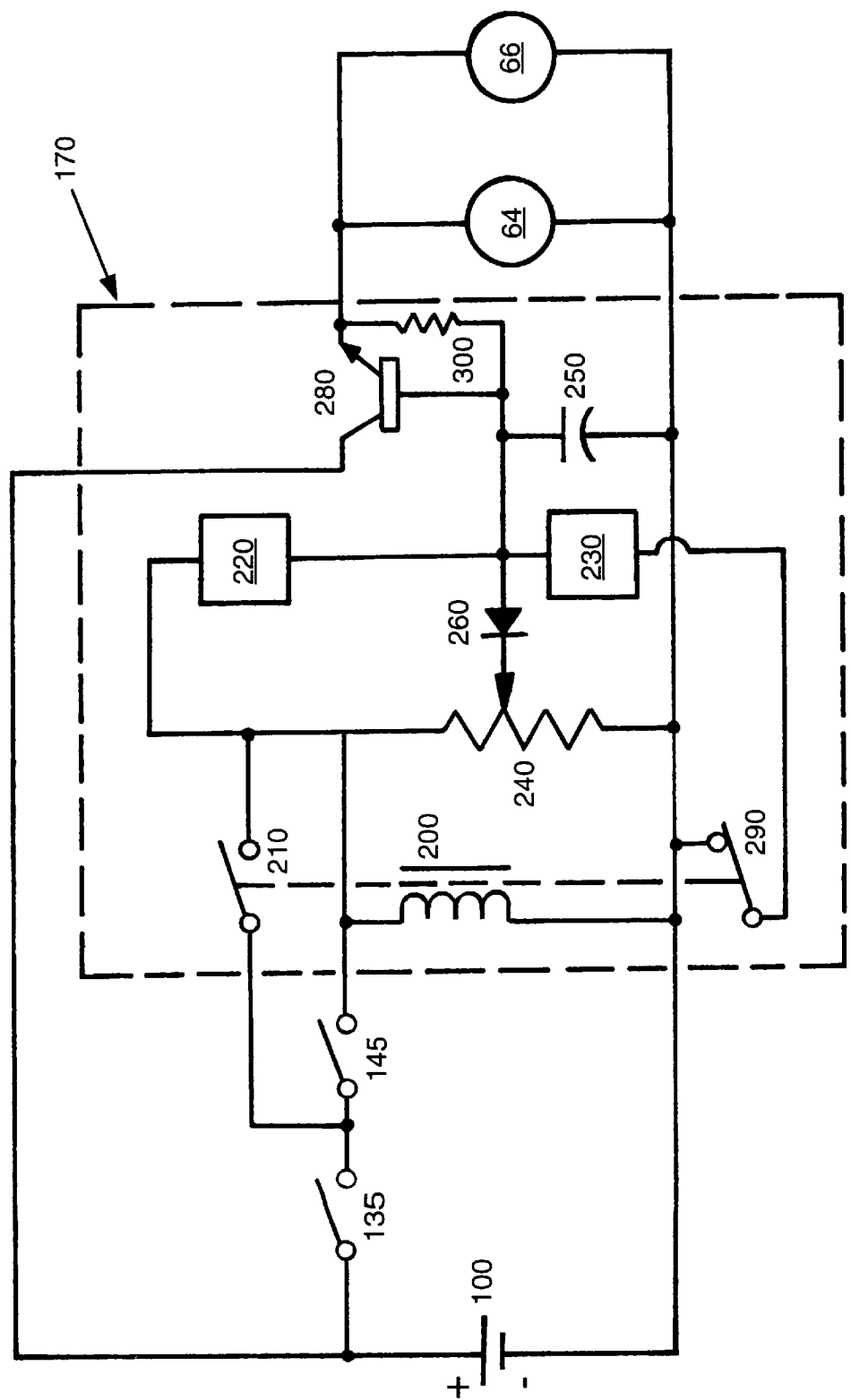
FIG. 10 is a schematic drawing detailing the speed control circuitry for giving control of the acceleration and deceleration of the motorized infant stroller.

FIG. 10 schematically shows the circuitry that typifies the components that will provide the safe startup sequence by using the simultaneous depression of two switch contacts and also the controlled acceleration and deceleration when starting and stopping the propulsion of the infant stroller.

The battery 100 provides the energy necessary to operate the motorized stroller control and propulsion system. Connected to the positive terminal of battery 100 is switch 135 that is operated by switch actuator 130, followed serially by switch 145 that is operated by switch actuator 140. Both switches must be depressed simultaneously to energize the coil of relay 200. There have been accidents in the past where when a single switch is used the occupant or some other unauthorized person, such as a young sibling, depresses a single starting switch causing the vehicle to proceed forward. By providing a startup sequence of simultaneously depressing a left-hand switch concurrently with depressing a right-handed switch, a safe startup sequence is provided. Energizing relay 200 causes the normally open (N.O.) relay contacts 210 to close thereby parallels the left-hand contacts 145. To maintain propulsion, once started, only the right-hand switch 135 requires a maintained contact closure. Alternatively, the operation of switches 135 and 145 may be interchanged according to the favored hand of the stroller operator.

Potentiometer 240 provides the desired set-point voltage corresponding to the desired speed of the stroller. Preferably, the velocity set point may range from 0.25 to 5 miles per hour.

The constant-current source 220, coacting with capacitor 250, provides a linearly increasing voltage ramp, causing a linearly increasing velocity when the stroller drive motor is started. The resulting voltage across capacitor 250 rises linearly positively until clamp diode 260 starts conducting, which corresponds to the set-point voltage established by potentiometer 240.

The NPN emitter follower 280 presents a high-impedance to the capacitor 250, thereby preventing the loading of capacitor 250. DC electric motors 64 and 66 derive their operating current via NPN transistor 280. Resistor 300, connected across the base to emitter junction of transistor 280 aids in providing temperature stable operation of the emitter follower circuitry.

Figure 11A:
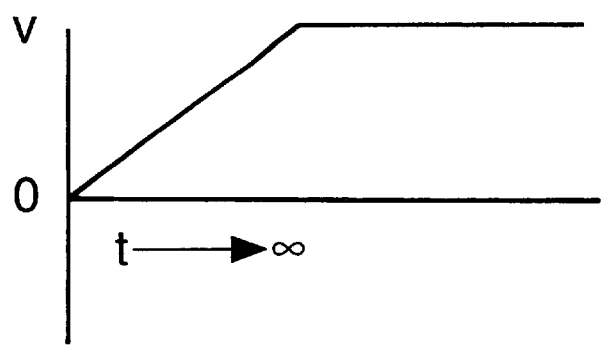
FIGS. 11A, 11B, 11C and 11D are graphs that illustrate the velocity and acceleration during startup and also during the stopping sequence.

Shown in FIG. 11a is the graphical representation that illustrates the linearly increasing velocity. The result of the linearly increasing velocity is a constant acceleration force, as shown in FIG. 11b, that is small enough to prevent the occupant being transported, from lurching or jerking backward when the motor drive system is started.

Controlled deceleration of the stroller motors is provided by the closure of the normally closed (N.C.) relay contacts 290, which in turn activates the constant current sink 230. This contact closure causes the linear discharge of capacitor 250, which results in a safe jerk-free constant deceleration, as shown in FIGS. 11c and 11d. The constant value of deceleration thereby ensures that the occupant is not subjected to high peak decelerations, but only to a safe predetermined value of deceleration.

Figure 11B:
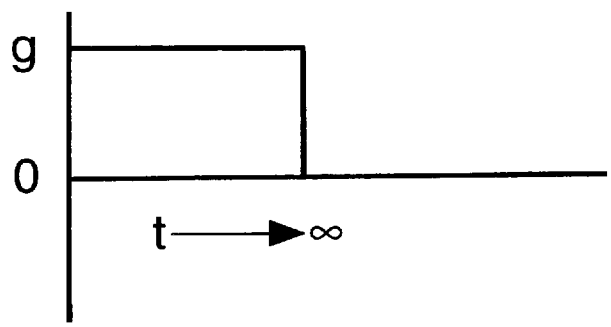
Figure 11C:
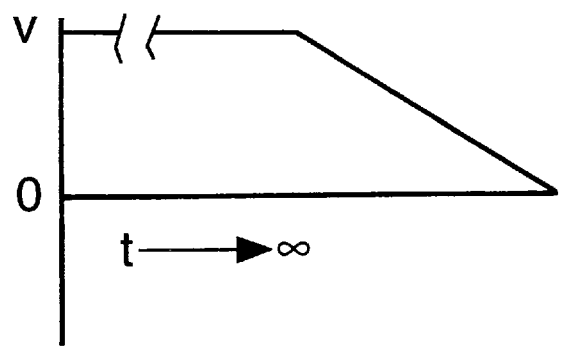
Figure 11D:
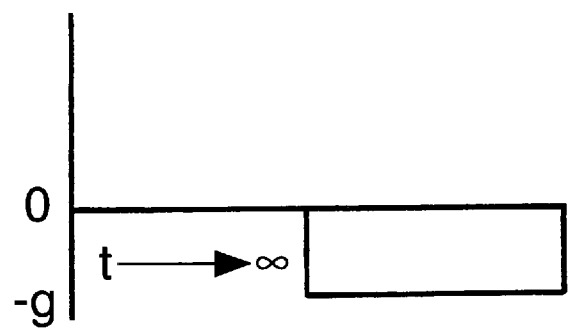

FIG. 11 shows the time coherent velocity and acceleration curves, the first two curves, FIGS. 11A and 11B, show a constant acceleration force when a linearly increasing velocity is applied as occurs when starting. The second two curves, FIGS. 11C and 11D, show a constant deceleration force when a linearly decreasing velocity is applied, as occurs when stopping.

Figure 12:
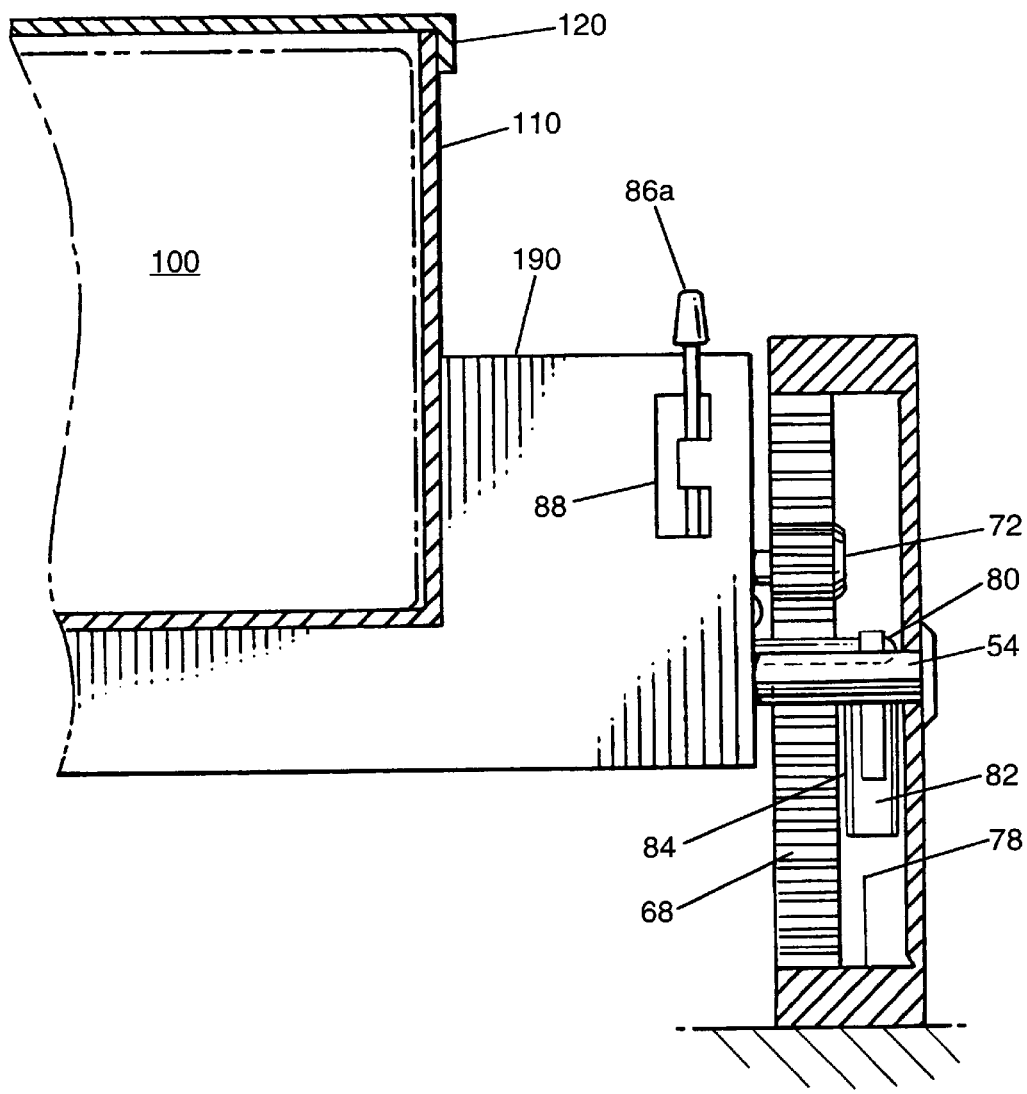
FIG. 12 is a rear view of the right side sectional view of an alternative embodiment of the infant stroller showing the attachment of the parking brake arm, including the brake drum and pad, to the parking brake engagement lever and the drive gearing.
Figure 12A:
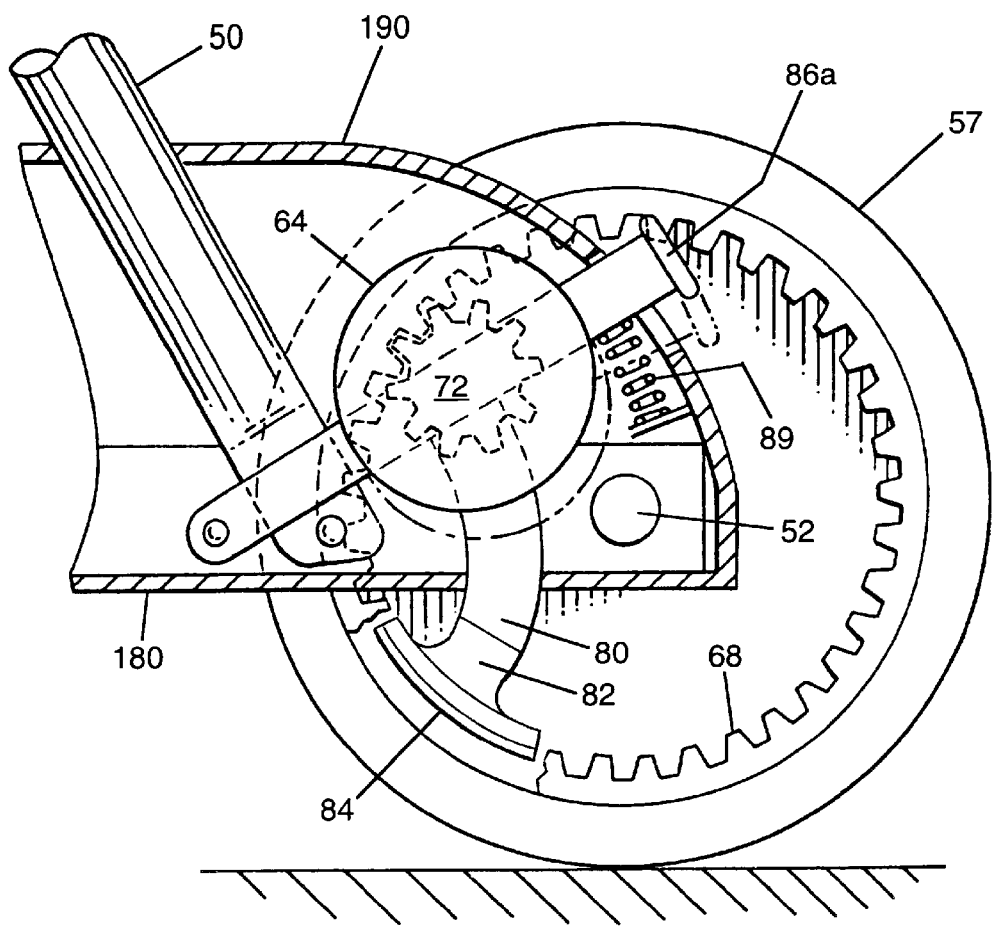
FIG. 12A is a side elevation of the right side sectional view of an alternative embodiment of the infant stroller showing the parking and drive engagement lever in the fully engaged drive position and in phantom lines, in the parked position with the brake fully applied.
Figure 12B:
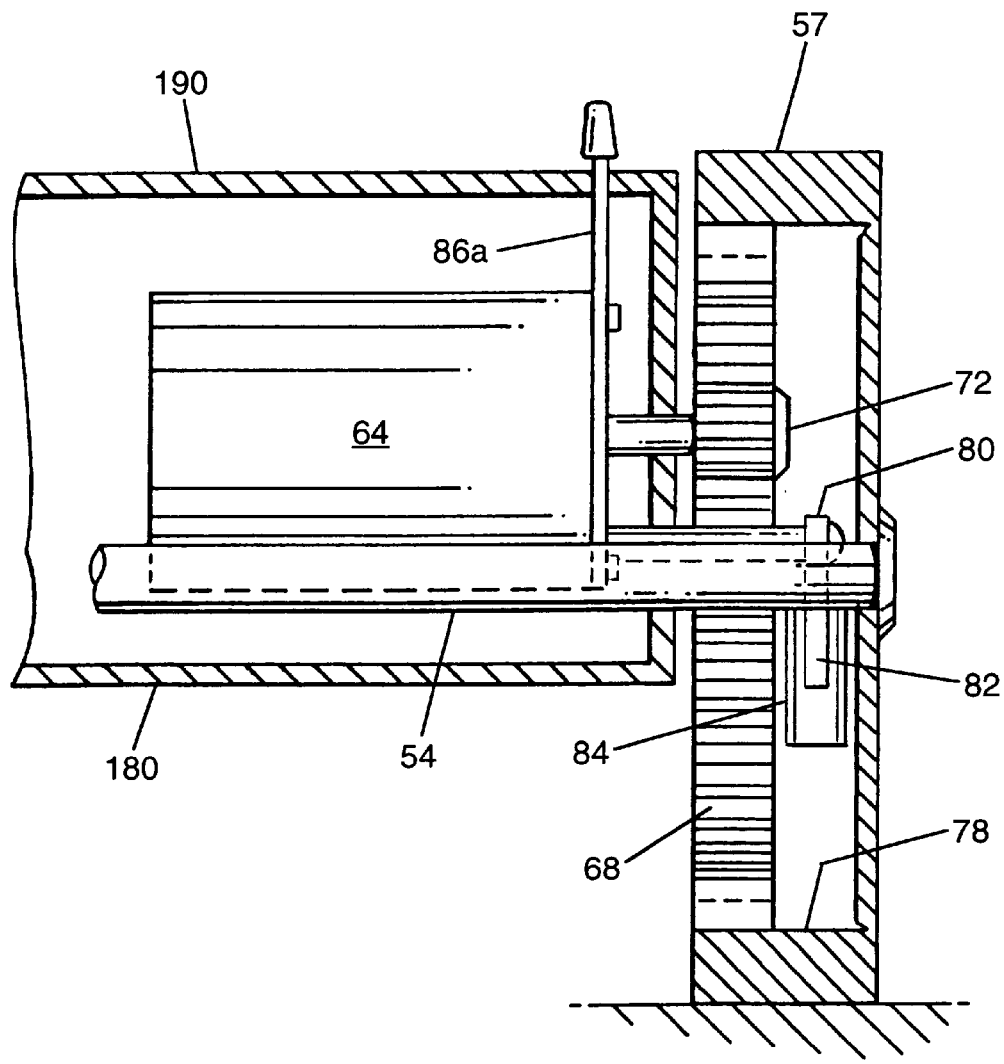
FIG. 12B is a rear view of the right side sectional view of an alternative embodiment of the infant stroller showing the attachment of the parking brake arm, including the brake drum and pad, to the parking brake engagement lever and the drive motor with drive engaging gearing.

As further shown in FIGS. 12, 12A and 12B, the rear parking brake and drive assembly of the alternative embodiment is detailed showing the major components of the assembly. The parking brake and drive engagement lever 86a can be positioned in one of two basis positions where the parking brake is fully applied or the drive gears fully meshed. In FIG. 12A, the lever arm 86a is shown fully engaged in the drive position and the phantom lines show the position of the lever arm in the braking position. The double-keyed slot 88 in the protective cover 190 maintains the current position of the parking brake and drive engagement lever 86a, either with the motor gearing fully engaged in the drive position (upper position), with the brake fully released or when in the lower position, the parking brake is fully applied, with the drive motor gearing fully disengaged.

Whereas the present invention has been described in detail in accordance with the drawing attached herein, it should be understood by those skilled in the art, that further modifications and improvements can be made without detracting from the spirit and scope of the present invention.

I claim:

1. A self-propelled infant stroller comprising:
    a frame assembly formed by a plurality of tubular shafts, the frame assembly including a handle;
    a plurality of wheels mounted on the frame assembly with at least one of the wheels being a driven wheel;
    a propulsion control system including a control console housing mounted on said handle;
    a single, hand operated control lever mounted to the frame adjacent the driven wheel for pivotal movement between first and second positions relative to the driven wheel;
    a drive motor mounted on the control lever, said drive motor having an output shaft with a drive gear extending from one side of said control lever, and said drive motor being controlled by said propulsion control system;
    a brake member extending from an opposite side of the control lever, said brake member being selectively engageable with a braking surface on the driven wheel;
    a driven gear mounted on the driven wheel, said shaft drive gear being selectively engagable with said driven gear; and,
    means for selectively securing the control lever in the first position in which the drive gear is in driving engagement with the driven gear and the brake member is disengaged from the braking surface for propelling the stroller, and in the second position in which the drive gear is disengaged from the driven gear and the brake member is engaged with the braking surface for preventing rolling movement of the stroller.

2. The self-propelled infant stroller according to claim 1, the propulsion control system further comprising a means for controlling stroller acceleration for avoiding any excessive acceleration force upon an infant passenger and a means for controlling stroller deceleration to prevent a jerking motion to the infant passenger upon decelerating the stroller.

3. The self-propelled infant stroller of claim 2, the propulsion control system further comprising a means for setting stroller velocity to a desired constant speed.

4. The self-propelled infant stroller of claim 3, further comprising a means for safely starting the propulsion system for preventing an unauthorized start-up of the stroller.

5. The self-propelled infant stroller of claim 4, wherein the means for safely starting comprises first and second hand operated switch actuators, a first switch operated by said first switch actuator serially connected with a second switch operated by said second switch actuator, and a stroller starting sequence consequent only to a simultaneous depression of both actuators.

6. The self-propelled infant stroller of claim 5, the propulsion control system further comprising a relay with a relay coil having normally open relay contacts in parallel with said second switch;
    wherein the stroller starting sequence provides a resultant energized propulsion maintained by a continued depression of just one of said switch actuators.

7. The self-propelled infant stroller according to claim 6, wherein the drive motor is powered by an at least one sealed gel rechargeable battery for safety of the infant passenger.

8. The self-propelled infant stroller of claim 7, wherein the means for setting stroller velocity comprising the control console having a speed dial that provides an operating set point that corresponds with a desired stroller speed.

9. The self-propelled infant stroller according to claim 8, wherein the driven gear and the braking surface are both positioned on an inner portion of the same stroller wheel.

10. A self-propelled infant stroller comprising:
    a frame assembly formed by a plurality of tubular shafts, the frame assembly including a handle;
    a plurality of wheels mounted on the frame assembly with at least one of the wheels being a driven wheel;
    a propulsion control system including a control console housing mounted on the handle with first and second hand operated switch actuators in a stroller starting sequence for safely starting the system only by a simultaneous depression of both actuators with a resultant energized propulsion continued by depression of just one of said switch actuators;
    a single, hand operated control lever mounted to the frame adjacent the driven wheel for pivotal movement between first and second positions relative to the driven wheel;
    a drive motor mounted on the control lever, said drive motor having an output shaft with a drive gear extending from one side of said control lever, and said drive motor being controlled by said propulsion control system;
    a brake member extending from an opposite side of the control lever, said brake member being selectively engageable with a braking surface on the driven wheel;
    a driven gear mounted on the driven wheel, said shaft drive gear being selectively engagable with said driven gear; and,
    means for selectively securing the control lever in the first position in which the drive gear is in driving engagement with the driven gear and the brake member is disengaged from the braking surface for propelling the stroller, and in the second position in which the drive gear is disengaged from the driven gear and the brake member is engaged with the braking surface, whereby said motor and brake are integrally operative for transfer from motorized to manual operation by single action of the control lever.

11. A self-propelled infant stroller comprising:

a frame assembly formed by a plurality of tubular shafts, the frame assembly including a handle;

a plurality of wheels mounted on the frame assembly with at least one of the wheels being a driven wheel;

a propulsion control system including a control console housing mounted on said handle;

a single, hand operated control lever mounted to the frame adjacent the driven wheel for pivotal movement between first and second positions relative to the driven wheel;

a drive motor mounted on the control lever, said drive motor having an output shaft with a drive wheel extending from one side of said control lever, and said drive motor being controlled by said propulsion control system;

a brake member extending from an opposite side of the control lever, said brake member being selectively engageable with a braking surface on the driven wheel;

a driven surface on the driven wheel, said driven surface being selectively in frictional contact with said drive wheel; and, means for selectively securing the control lever in the first position with the drive wheel frictionally contacting the driven wheel and the brake member disengaged from the braking surface for propelling the stroller, and in the second position in which the drive wheel is removed from frictional contact with the driven wheel and the brake member is engaged with the braking surface, whereby said motor and brake are integrally operative for transfer from motorized to manual operation by single action of the control lever.

* * * * *